United States Patent
Tripoli et al.

(10) Patent No.: US 8,661,871 B2
(45) Date of Patent: Mar. 4, 2014

(54) METHOD FOR TESTING A MICROELECTROMECHANICAL DEVICE, MICROELECTROMECHANICAL DEVICE

(75) Inventors: Giovanni Carlo Tripoli, Milan (IT); Tommaso Ungaretti, Pavia (IT); Ernesto Lasalandra, S. Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 709 days.

(21) Appl. No.: 12/846,507

(22) Filed: Jul. 29, 2010

(65) Prior Publication Data
US 2011/0023605 A1 Feb. 3, 2011

(30) Foreign Application Priority Data

Jul. 31, 2009 (IT) ............... TO2009A0594

(51) Int. Cl.
*G12B 13/00* (2006.01)
(52) U.S. Cl.
USPC ........................................ 73/1.01; 333/186
(58) Field of Classification Search
USPC .................... 73/1.01; 333/186, 188
See application file for complete search history.

(56) References Cited

U.S. PATENT DOCUMENTS

| | | | |
|---|---|---|---|
| 5,583,290 A | 12/1996 | Lewis | |
| 7,039,513 B2 | 5/2006 | Hermann et al. | |
| 7,616,078 B2 * | 11/2009 | Prandi et al. | 333/186 |
| 2005/0016273 A1 | 1/2005 | Murata et al. | |
| 2007/0289382 A1 * | 12/2007 | Caminada et al. | 73/504.12 |
| 2008/0106351 A1 * | 5/2008 | Prandi et al. | 333/24 C |
| 2008/0216572 A1 | 9/2008 | Aoyama | |
| 2010/0000289 A1 * | 1/2010 | Prandi et al. | 73/1.37 |

FOREIGN PATENT DOCUMENTS

DE 10350536 B3 6/2005

OTHER PUBLICATIONS van Spengen et al., "The Prediction of Stiction Failures in MEMS," IEEE Transactions on Device and Materials Reliability 3(4):167-171, Dec. 2003.

* cited by examiner

*Primary Examiner* — Hezron E Williams
*Assistant Examiner* — Rodney T Frank
(74) *Attorney, Agent, or Firm* — Seed IP Law Group PLLC

(57) ABSTRACT

Described herein is a method for testing a microelectromechanical device provided with a microstructure having a fixed structure and a movable mass, which is capacitively coupled to the fixed structure and mechanically connected thereto so as to be movable between a rest position and at least one position of maximum extension. The method envisages: applying a test voltage between the movable mass and the fixed structure so as to set up an electrostatic force between them and displace the movable mass into the position of maximum extension; keeping the movable mass in the position of maximum extension for a time interval; releasing the movable mass from the position of maximum extension; and detecting a current position of the movable mass.

20 Claims, 7 Drawing Sheets

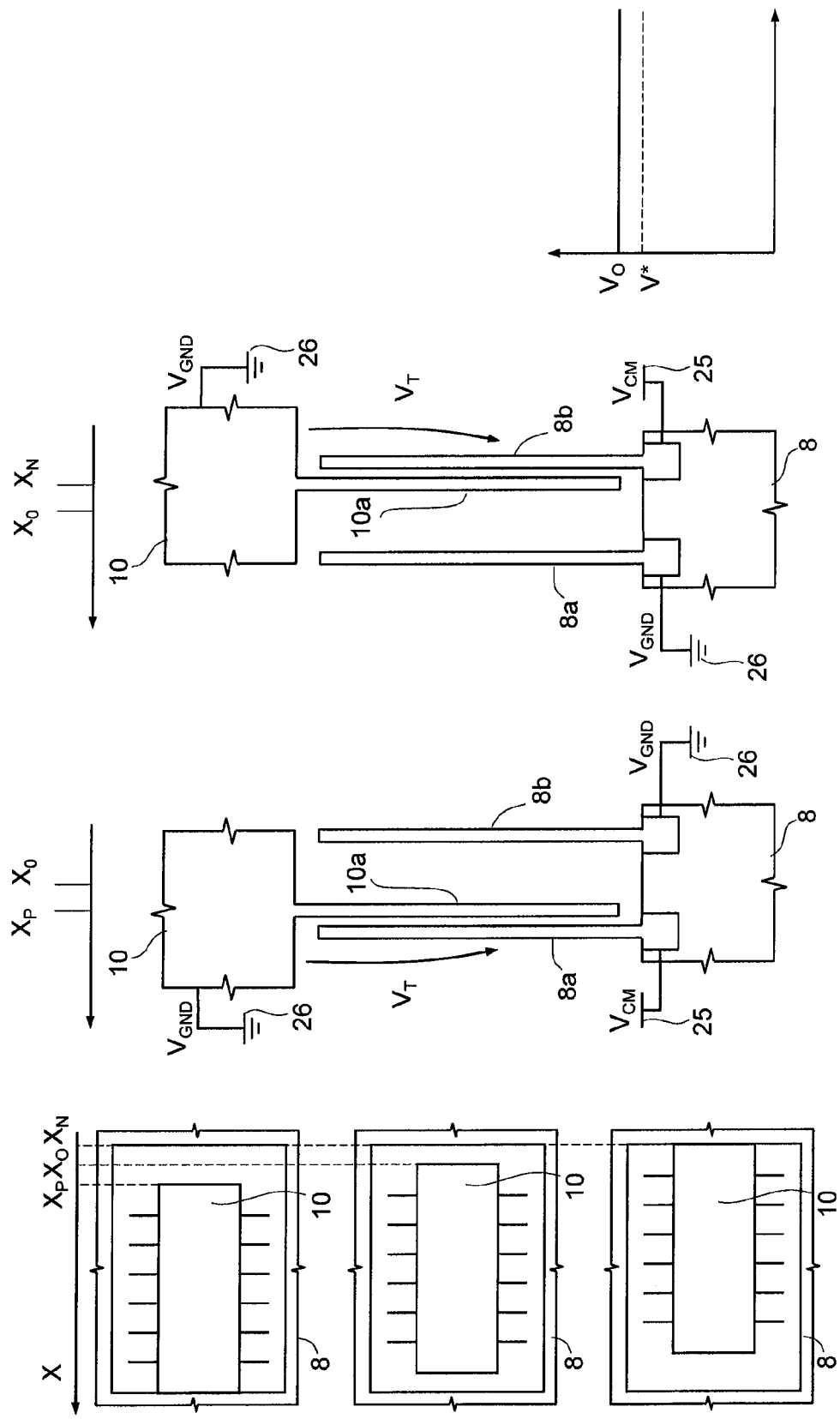

METHOD FOR TESTING A MICROELECTROMECHANICAL DEVICE, MICROELECTROMECHANICAL DEVICE

BACKGROUND

1. Technical Field

The present disclosure relates to a method for testing a microelectromechanical device and to a microelectromechanical device.

2. Description of the Related Art

As is known, several types of microelectromechanical sensors, dedicated to numerous applications, have recently been developed. Just to cite a few examples, amongst the microelectromechanical sensors that are increasingly frequently used there may be recalled linear and rotational accelerometers, gyroscopes, pressure sensors, acoustic sensors and transducers (microphones), and so forth. Generally, a microelectromechanical sensor comprises a first semiconductor chip, in which a microstructure with movable parts and fixed parts is made, and a second semiconductor chip, in which control, driving, and read circuits are integrated. The first and second semiconductor chips are bonded and electrically coupled to one another and are incorporated in a single package.

The microstructure defines the sensitive element of the device, and the circuitry is coupled thereto for converting the state and/or the movements of movable parts of the microstructure into signals indicating a physical quantity detected.

As with all electronic devices, microelectromechanical sensors can be tested by test devices that enable verification of their proper operation. As regards control, driving and read circuits, execution of tests both in the factory and in use does not entail particular difficulties, and dedicated integrated components or external components, coupled through the input/output terminals of the microelectromechanical sensors can be used for this purpose.

Things are instead different for the verification of the microstructure. Also this, in fact, is subject to malfunctioning that may derive from defects of manufacture or else from use, ageing, or any damage suffered. However, verifications of functionality of the microstructure are far from simple, since testing involves transmitting mechanical stresses (accelerations or force pulses) such as to cause a detectable response at output by the microstructure itself. In practice, a microelectromechanical sensor is subjected to a known stress, and its output is monitored.

If the signals supplied in response are compatible with the stress undergone, the test is passed; otherwise, the microelectromechanical sensor is rejected.

It is, however, evident that, owing to excessive cost in terms of time, tests of this sort can be conducted only on a restricted sample of sensors, whereas it would be desirable to have available methods and sensors suited for conducting verifications of proper operation on a vast scale and, in particular, after the devices have left the factory.

BRIEF SUMMARY

One embodiment of the present disclosure provides a method for testing a microelectromechanical device, and a corresponding microelectromechanical device that enable to overcome the limitations described.

BRIEF DESCRIPTION OF THE SEVERAL VIEWS OF THE DRAWINGS

For a better understanding of the disclosure, some embodiments thereof will now be now described, purely by way of non-limiting example and with reference to the attached drawings, wherein:

FIG. 5 is a graph showing schematically different operating positions of the device of FIG. 1;

FIG. 8 shows a detail of the device of FIG. 1 in a first operating configuration;

FIG. 9 is a graph showing quantities regarding the device of FIG. 1;

FIG. 10 shows the detail of FIG. 8 in a second operating configuration;

DETAILED DESCRIPTION

Figure 1:
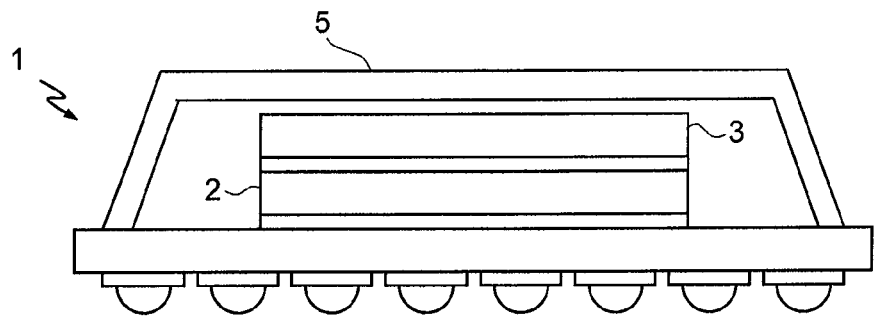
FIG. 1 is a cross section through a microelectromechanical device according to one embodiment of the present disclosure.
Figure 2:
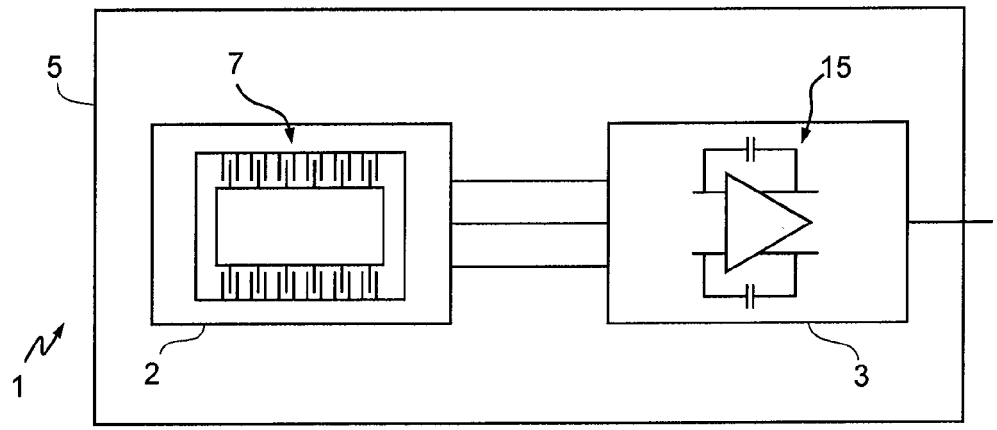
FIG. 2 shows a simplified block diagram of the device of FIG. 1.

Illustrated schematically in FIGS. 1 and 2 is a microelectromechanical sensor, which in the embodiment described is a linear accelerometer 1. This is not to be in any case understood in a limiting sense, since what is described hereinafter applies equally to microelectromechanical sensors of a different type, such as, in particular, rotational accelerometers, gyroscopes, pressure sensors, and also acoustic transducers, such as microphones or loudspeakers.

The accelerometer 1 comprises a first semiconductor chip 2 and a second semiconductor chip 3, bonded to one another, electrically coupled and encapsulated in one and the same package 5 for electronic devices.

Figure 3:
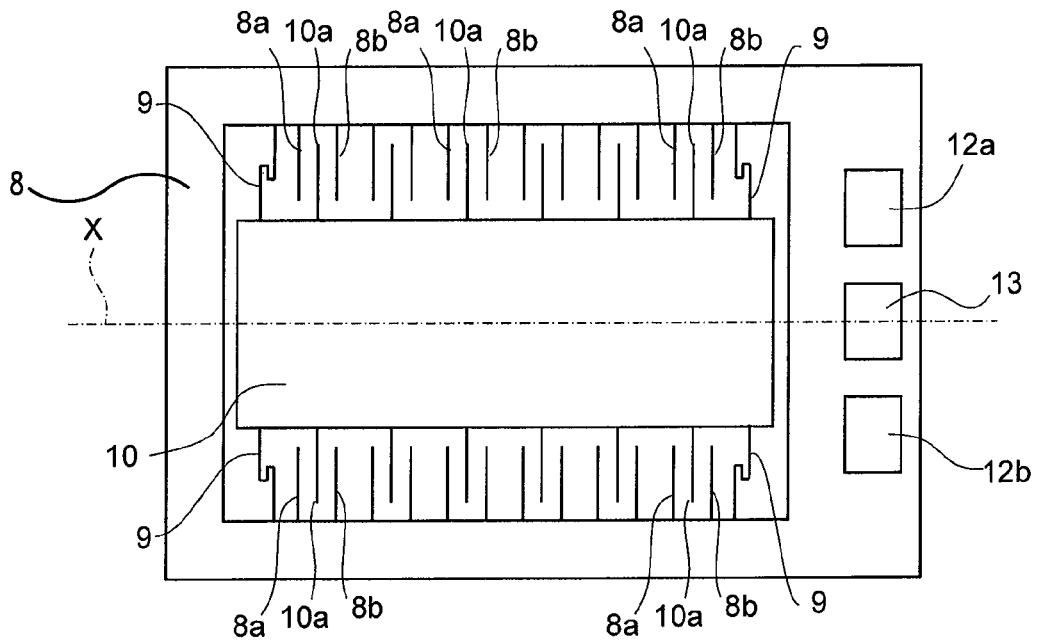
FIG. 3 is a simplified plan view of a part of the device of FIG. 1.
Figure 4:
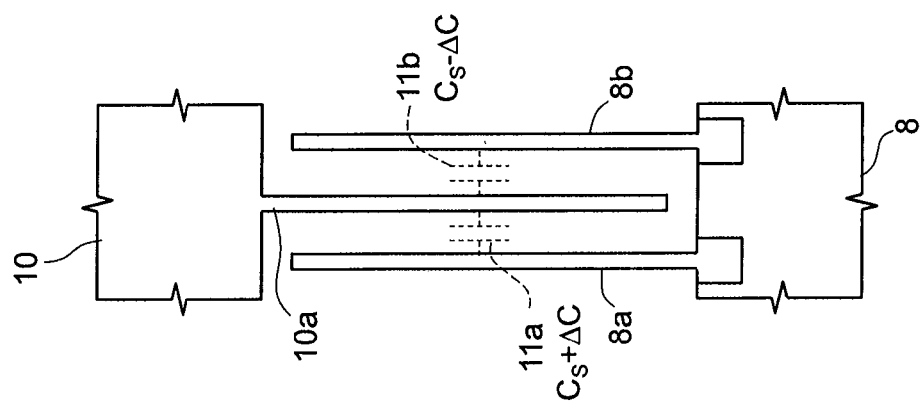
FIG. 4 shows an enlarged detail of FIG. 3.

As illustrated also in FIGS. 3 and 4, a microstructure 7 is integrated in the first semiconductor chip 2 and comprises a fixed structure or stator 8 and a movable mass 10, capacitively coupled to the stator 8. More precisely, the movable mass 10 is elastically connected to the stator 8 elastic suspensions 9 so as to oscillate about a rest position $X_0$ with one degree of freedom, in this case one translational degree of freedom along an axis X. In particular, the movable mass 10 can translate between a position of maximum positive extension $X_P$ and a position of maximum negative extension $X_N$ (FIG. 5), in which positions it normally bears upon the stator 8, on opposite sides. The movable mass 10 is provided with movable electrodes 10a (FIG. 4), integral thereto, which extend parallel towards the stator 8 and are arranged between respective first and second fixed electrodes 8a, 8b, integral to the stator 8 and electrically insulated from one another. Each movable electrode thus forms a first capacitor 11a and a second capacitor 11b with the respective first and second fixed electrodes 8a, 8b. The capacitors 11a, 11b have differential capacitances $CS+\Delta C$, $CS-\Delta C$ that depend upon the position of the movable mass 10 with respect to the stator 8. The first electrodes 8a and the second electrodes 8b are respectively connected to a first stator terminal 12a and to a second stator terminal 12b, whereas the movable mass 10, and hence all the movable electrodes 10a, are connected to the same movable-mass terminal 13.

Consequently, the capacitive coupling between the movable mass 10 and the stator 8 is of a differential type, through two capacitances as a whole equal to the sum of the capacitances of the first capacitors 11a and of the second capacitors 11b, respectively.

Figure 6:
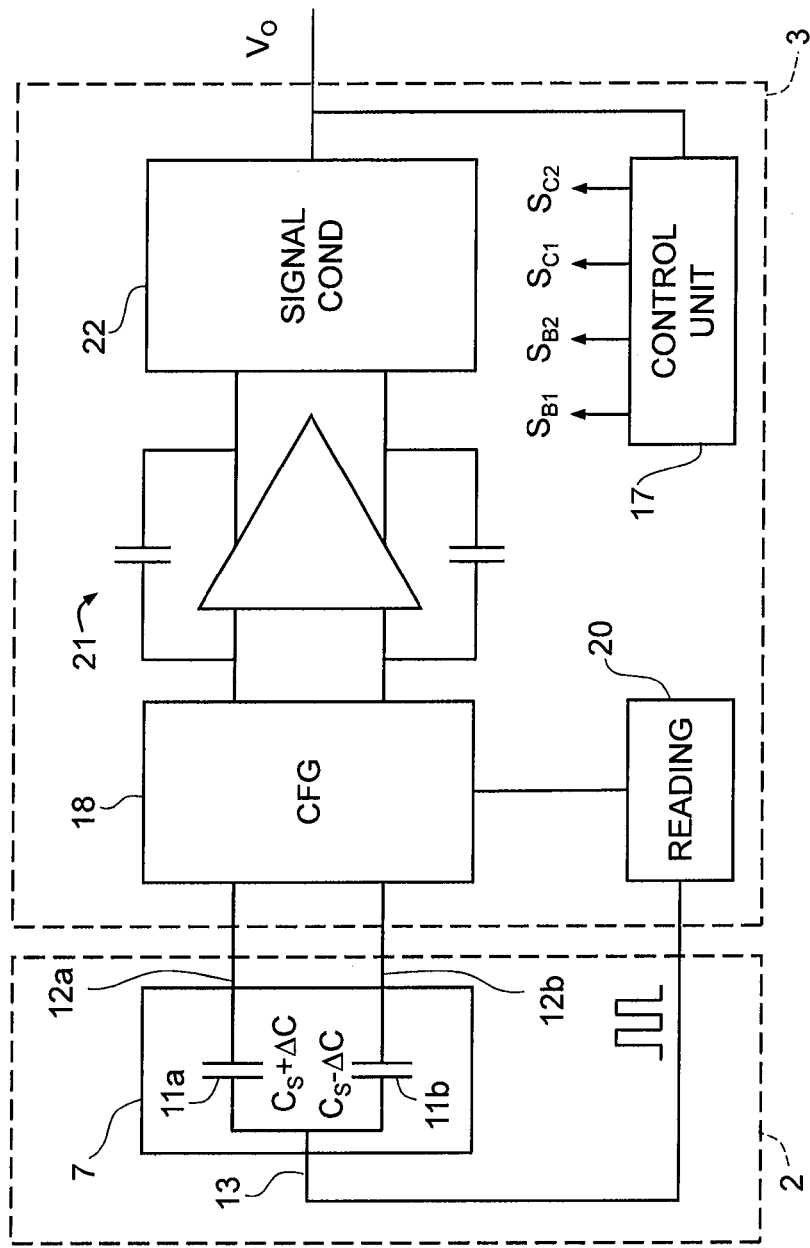
FIG. 6 is a more detailed block diagram of the device of FIG. 1.

With reference once again to FIG. 2 and, moreover, to FIG. 6, a read device 15 is integrated in the second semiconductor chip 3 and comprises a control unit 17, which supplies a plurality of control signals, as explained in greater detail hereinafter, a configuration stage 18, a read generator 20, a charge amplifier 21, and a conditioning stage 22.

The configuration stage 18, controlled by the control unit 17 through the control signals, switches the read device 15 between a read configuration and a test configuration. In the read configuration, the displacements of the movable mass 10 are converted by the charge amplifier 21 and by the conditioning stage 22 into an output signal $V_O$ indicating the acceleration of the accelerometer 1 along the axis X. More precisely, the output signal is correlated to the position of the movable mass 10, which is in turn indicative of the acceleration of the accelerometer 1. In the test configuration, the configuration stage 18 co-operates with the read generator 20 for applying an electrostatic force to the movable mass 10, exploiting the capacitive coupling with the stator 8, so as to bring the movable mass 10 itself into a test position.

In the read configuration, the read generator 20 supplies a square-wave read signal $S_R$ to the movable-mass terminal 13 of the accelerometer 1, while in the test configuration it is controlled so as to keep the movable-mass terminal 13 itself at a reference voltage, for instance a ground voltage. In the test configuration, in practice, the read generator 20 is used as biasing element of the movable mass 10.

The charge amplifier 21, which together with the conditioning stage defines a read interface for detecting the position of the movable mass 10, is of the fully differential switched-capacitor type. In the read configuration, a first input 21a and a second input 21b of the charge amplifier 21 are selectively connectable, respectively, to the first stator terminal 12a and to the second stator terminal 12b to receive from the accelerometer 1 differential charge packets (not illustrated), indicating the variations of capacitance $\Delta C$ of the capacitors 11a, 11b caused by displacements of the movable mass 10. The charge packets are converted into voltage and further processed by the conditioning stage 22 to obtain the output signal $V_O$, which is made available, on the outside, on an output terminal 23.

Figure 7:
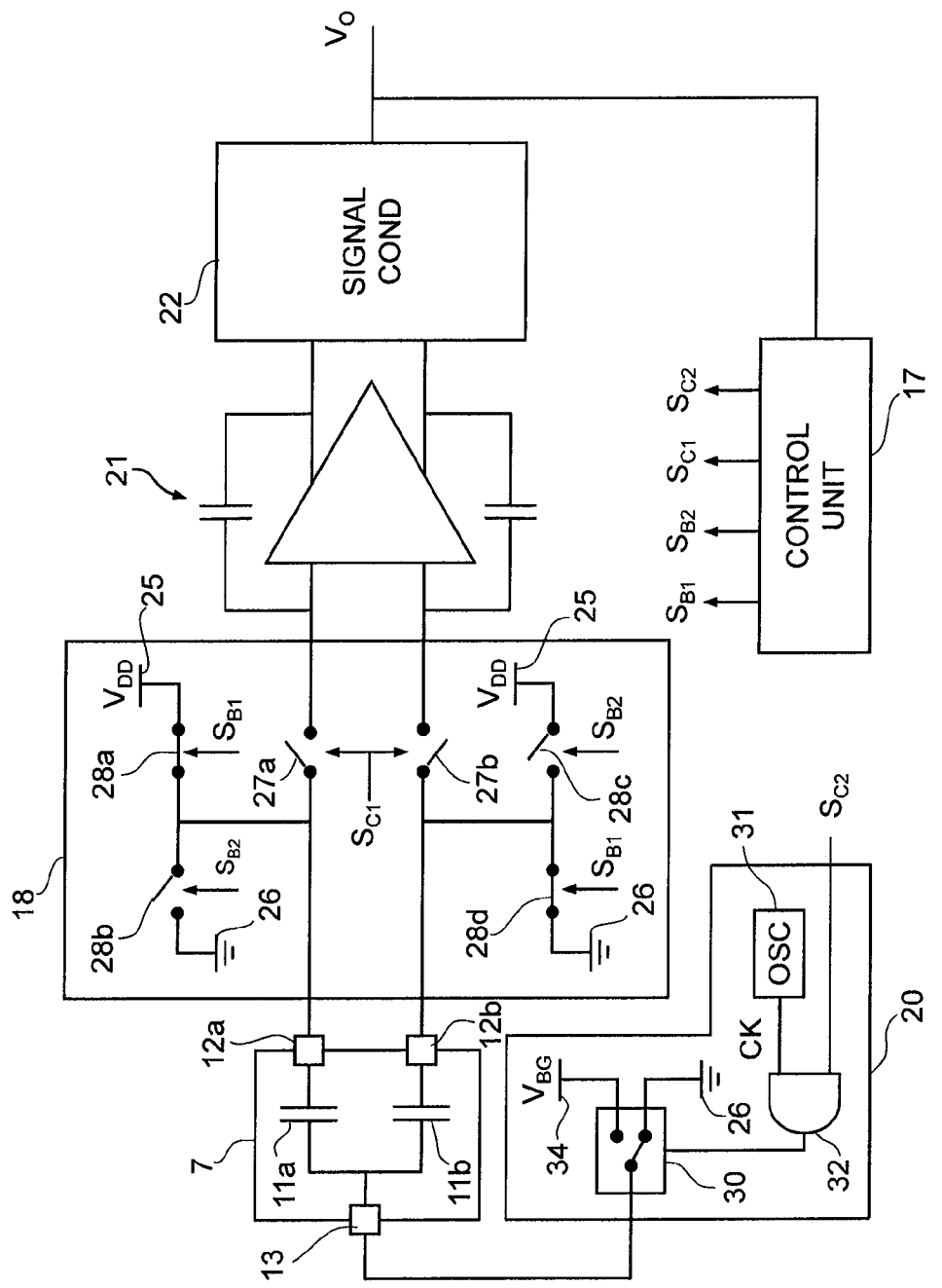
FIG. 7 is a hybrid circuit diagram of the device of FIG. 1.

FIG. 7 shows in greater detail, according to one embodiment, the configuration stage 18 and the read generator 20.

The configuration stage 18 comprises a plurality of switches, which, according to the operating configuration required by the control unit 17, connect the stator terminals 12a, 12b selectively to a supply line 25, which supplies a supply voltage $V_{DD}$, to a ground line 26, set at a ground voltage $V_{GND}$) or to the inputs 21a, 21b of the charge amplifier 21.

In greater detail, a first configuration switch 27a and a second configuration switch 27b are respectively arranged between the first stator terminal 12a and the first input 21a of the charge amplifier 21 and between the second stator terminal 12b and the second input 21b of the charge amplifier 21. A first configuration signal $S_{C1}$, supplied by the control unit 17, controls the configuration switches 27a, 27b so as to disconnect the stator terminals 12a, 12b from the inputs 21a, 21b selectively in the test configuration.

A first biasing switch 28a is connected between the first stator terminal 12a and the supply line 25 and is controlled by a first biasing signal $S_{B1}$, supplied by the control unit 17.

A second biasing switch 28b has a first terminal connected to the first stator terminal 12a and a second terminal connected to the ground line 26. The second biasing switch 28b is controlled by a second biasing signal $S_{B2}$, supplied by the control unit 17.

A third biasing switch 28c is connected between the second stator terminal 12b and the supply line 25 and is controlled by the second biasing signal $S_{B2}$.

A fourth biasing switch 28d has one terminal connected to the second stator terminal 12b and a second terminal connected to the ground line 26. The fourth biasing switch 28d is controlled by the first biasing signal $S_{B1}$.

In one embodiment, the read generator 20 comprises a selector 30, an oscillator 31, which generates a square-wave timing signal CK, and an AND logic gate 32. The selector 30 is structured for connecting alternatively the movable-mass terminal 13 of the microstructure 7 to the ground line 26 and to a read line 34, supplying a read voltage, for example a band-gap voltage $V_{BG}$.

The AND logic gate 32 receives the timing signal CK from the oscillator 31 and a second configuration signal $S_{C2}$ from the control unit 17. The output of the AND logic gate 32 controls the selector 30 and determines the connection of the movable-mass terminal 13 with the ground line (output of the AND logic gate 32 low) or with the read line 37 (output of the AND logic gate 32 high).

The accelerometer 1 is operated as follows.

Normally, the control unit 17 sets the read configuration. In this condition, in particular, the control unit 17 connects the stator terminals 12a, 12b of the microstructure 7 to the respective inputs 21a, 21b of the charge amplifier 21, closing the configuration switches 27a, 27b, and opens all the biasing switches 28a-28d.

In addition, the second configuration signal $S_{C2}$ is high and enables the timing signal CK to transit through the AND logic gate 32 of the read generator 20. The selector 30 hence switches cyclically at the frequency set by the timing signal CK and thus generates the square-wave read signal $V_R$, which is supplied to the movable-mass terminal 13 of the microstructure 7.

When a test for proper operation of the accelerometer 1 is carried out, the control unit 17 initially sets the test configuration (illustrated in FIG. 7). The configuration switches 27a, 27b are opened, while the biasing switches 28a-28d are controlled so as to connect the stator terminals 12a, 12b, one to the supply line 25, and the other to the ground line 26. In the example of FIG. 7, in particular, the first biasing switch 28a and the fourth biasing switch 28d are closed, and the second biasing switch 28b and the third biasing switch 28c are open. Consequently, the first stator terminal 12a is connected to the supply line 25, and the second stator terminal 12b is connected to the ground line 26.

In addition, the control unit 17 brings the second configuration signal $S_{C2}$ to the low logic value, blocking the AND logic gate 32 at the same value. The movable-mass terminal 13 of the microstructure 7 is thus connected to the ground line 26.

Thanks to the capacitive coupling between the stator 8 and the movable mass 10 and to the voltages applied as a result of the state of the biasing switches 28a-28d, an electrostatic force is set up between the stator 8 and the movable mass 10. In the case described, in particular, the electrostatic force acts between the first fixed electrodes 8a of the stator 8 and the movable electrodes 10a of the movable mass 10, which hence approach one another. In addition, the test voltage $V_T$ (equal to the difference $V_{DD}-V_{GND}$, which in this case coincides with the supply voltage $V_{DD}$) between the first fixed electrodes 8a of the stator 8 and the movable mass 10 is sufficient to bring the movable mass 10 to the end-of-travel position, in this case the position of maximum positive extension $X_P$ (FIG. 8). In the case where the supply voltage available is insufficient, it is possible to use a voltage-booster device that will enable application of a sufficient electrostatic force. The condition described is equivalent to having applied a very high acceleration, sufficient to saturate the microelectromechanical sensor 1, and is a critical condition. When the stator 8 and the movable mass 10 come into contact, in fact, there may occur microwelds that hinder or prevent return of the movable mass 10 into the rest position $X_0$. In this case, the reading of the microelectromechanical sensor 10 is falsified.

After having kept the movable mass 10 in the position of maximum positive extension $X_P$ for a test time interval, the control unit 17 restores the read configuration, releasing the movable mass 10. Consequently, the biasing switches 28a-28d are opened, while the configuration switches 27a, 27b are closed for connecting the stator terminals 12a, 12b of the microstructure 7 to the respective inputs 21a, 21b of the charge amplifier 21. In addition, the read generator 20 once again supplies the square-wave read signal $S_R$ to the movable-mass terminal 13 of the microstructure 7.

The control unit 17 then verifies proper operation by monitoring the output signal $V_O$ (which is indicative of the current position of the movable mass 10 and hence of the acceleration on the accelerometer 1) in conditions of rest and generates an error message ERR if the values of the output signal $V_O$ are not compatible. In particular, a situation of faulty operation, indicating possible microwelds, is detected when the output signal $V_O$ remains at constant values and above a threshold $V^*$ with the accelerometer 1 at rest (FIG. 9).

Once the verification step is through, the control unit 17 once again sets the test configuration, with opposite biasing. In practice, the configuration switches 27a, 27b are opened, and the second and third biasing switches 28b, 28c are closed. The first and fourth biasing switches 28a, 28d remain open. In this way, the first and second stator terminals 12a, 12b of the microstructure 7 are respectively connected to the ground line 26 and to the supply line 25.

The movable-mass terminal 10 is connected to the ground line 26 thanks to the second configuration signal $S_{C2}$, which is set at the low value and prevents the selector 30 of the read generator from switching.

Between the stator 8 and the movable mass 10 there is thus set up an electrostatic force that displaces the movable mass 10 into the position of maximum negative extension $X_N$ (FIG. 10).

After the testing time interval has elapsed, the control unit 17 restores the read configuration and detects proper operation by monitoring the output signal $V_O$ in conditions of rest and generates an error message ERR if the values of the output signal $V_O$ are not compatible.

Alternatively, verification of functionality can be carried out by bringing the movable mass 10 only into one of the positions of maximum positive extension and maximum negative extension, which is more susceptible to problems (for instance, by simulations or experimental tests on prototypes or samples).

Figure 11:
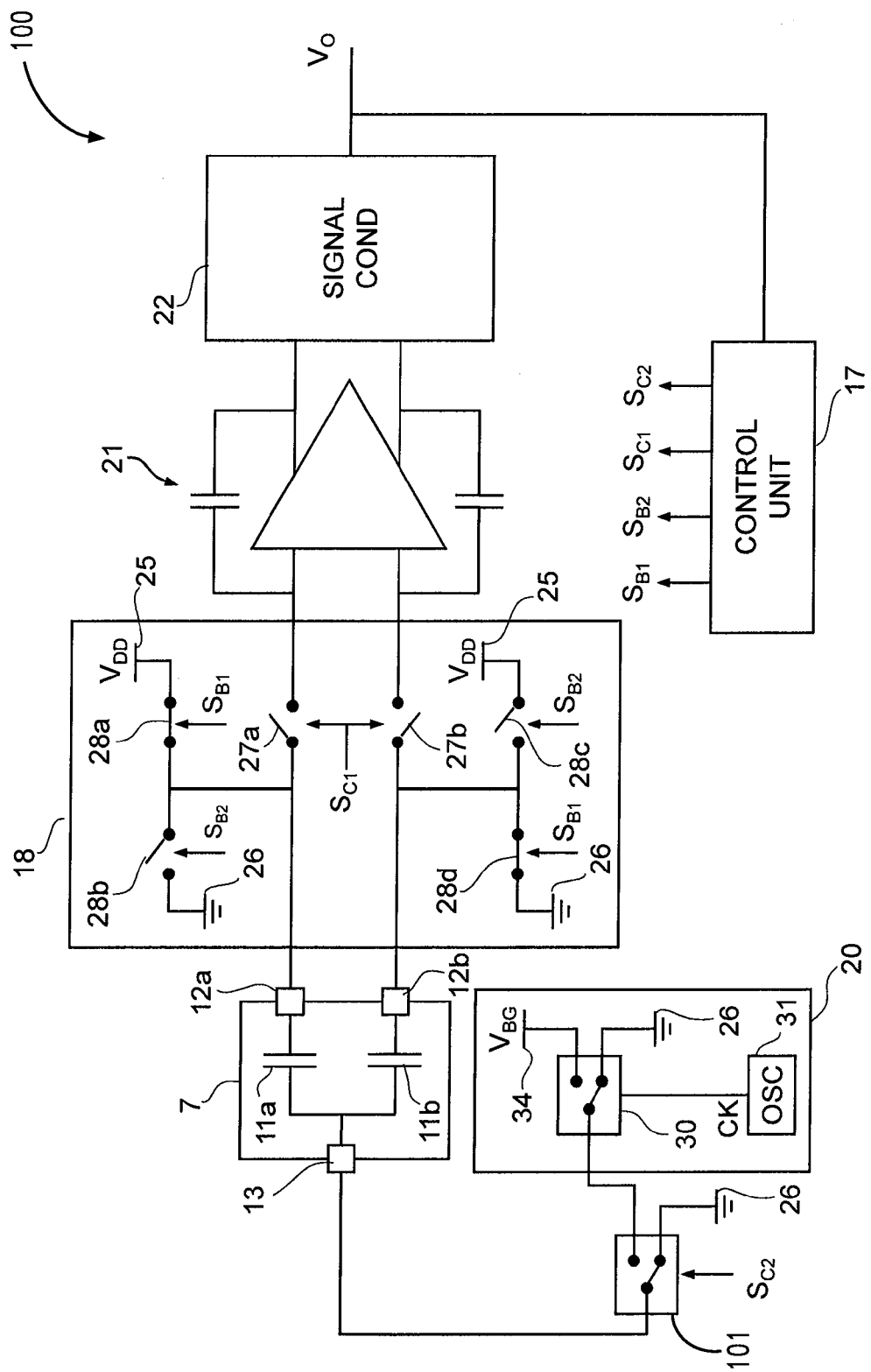
FIG. 11 is a simplified hybrid diagram of a microelectromechanical device in accordance with a different embodiment of the present disclosure.

A different embodiment of the disclosure is illustrated in FIG. 11, where parts that are the same as the ones already illustrated are designated by the same reference numbers. An accelerometer 100, in this case, comprises a biasing selector 101, as well as the configuration stage 18, a read generator 120, the charge amplifier 21, and the conditioning stage 22 (here not illustrated).

The selector 101 is structured so as to connect the movable-mass terminal 13 of the microstructure 7 alternatively to the output of the read generator 120 (in the read configuration) and to the ground line 26 (in the test configuration) and is controlled for this purpose by the second configuration signal $S_{C2}$ supplied by the control unit 17. In the read generator 120, the selector 30 is controlled directly by the oscillator 31, which, in the test configuration, can be deactivated, for example by the same second configuration signal $S_{C2}$.

Figure 12:
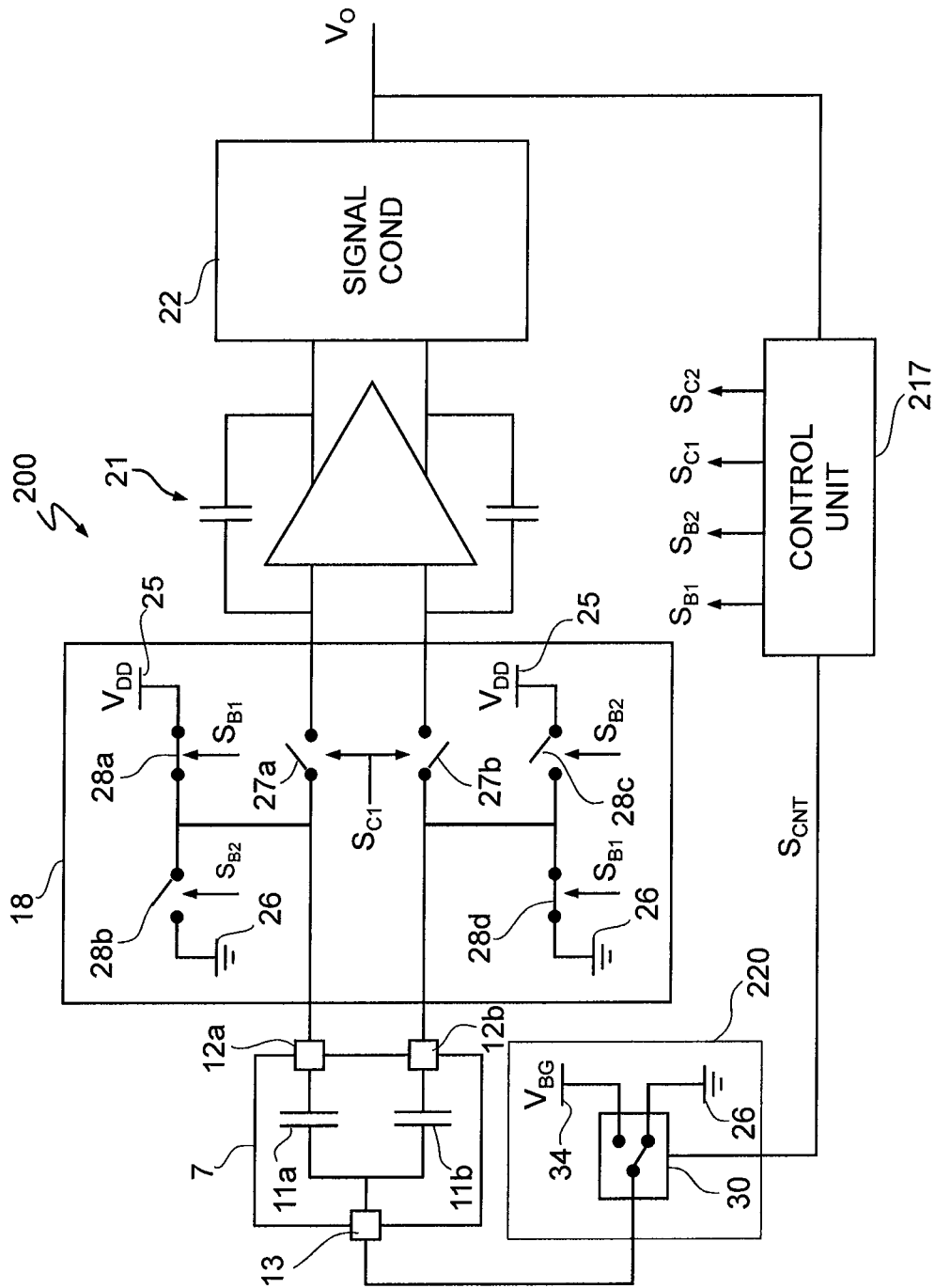
FIG. 12 is a simplified hybrid diagram of a microelectromechanical device in accordance with a further embodiment of the present disclosure.

In an accelerometer 200 according to a further embodiment of the disclosure (see FIG. 12), a control unit 217 directly controls the selector 30 of the read generator, here designated by 220 and including only the selector 30, by a control signal $S_{CNT}$ which has square-wave oscillations, when the control unit 217 sets the read configuration, while it is fixed at a value that determines connection of the movable-mass terminal 13 to the ground line 26, when the control unit 217 sets the test configuration.

The method and the device described advantageously enable to carry out the test for proper operation without any need to apply external forces, the effects of which can be simulated by electrostatic forces. The tests are hence simplified and, above all, their execution is made much faster and less costly. By exploiting the capacitive coupling between the stator and the movable mass, in fact, it is sufficient to apply appropriate voltages to the terminals of the microstructure, as described, whereas it is not necessary to move the entire device physically.

The verification of proper operation can moreover be executed at any time in the service life of the device. Hence, in particular, the device can be verified after packaging, which, not infrequently, causes degradation of the performance or even failure.

Figure 13:
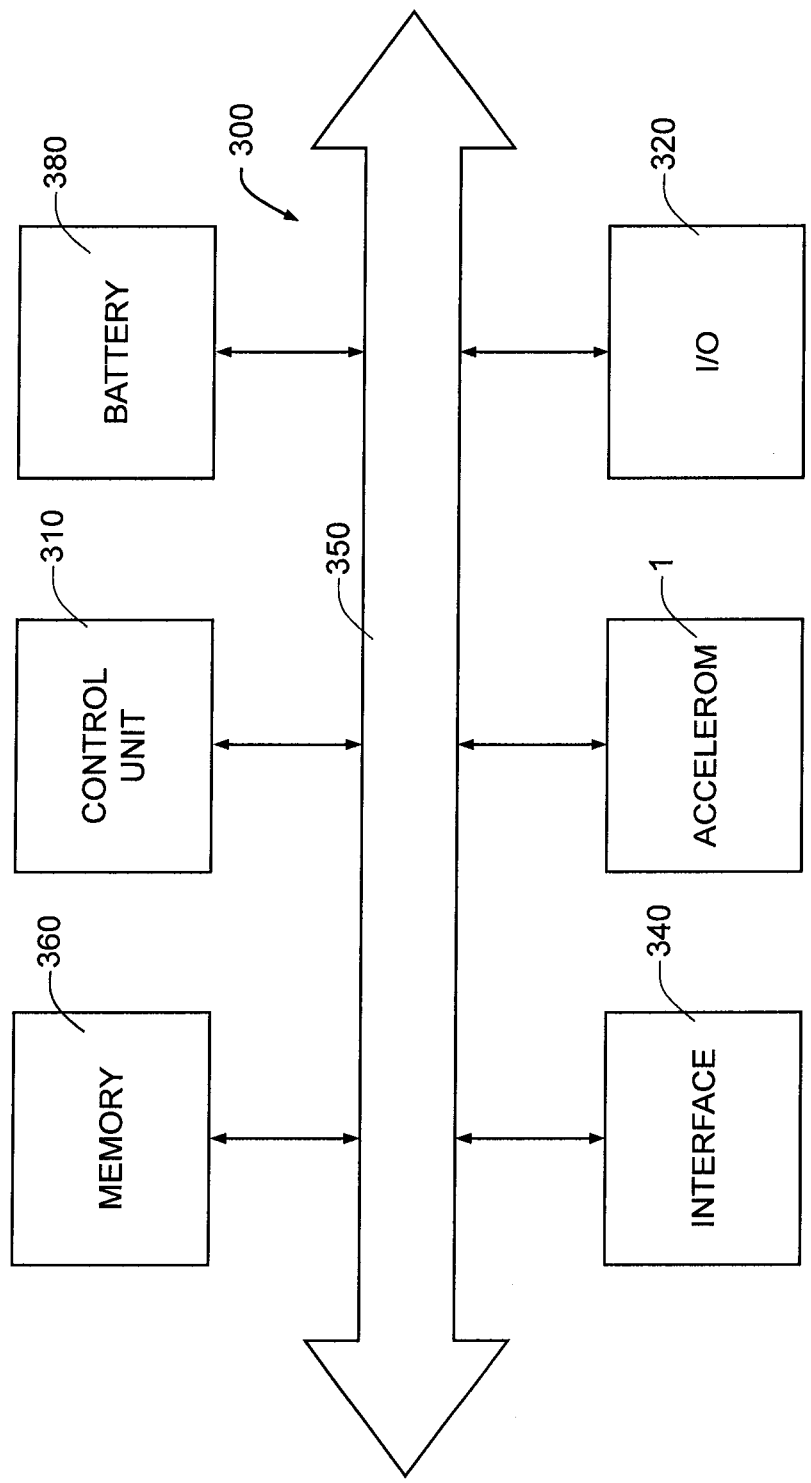
FIG. 13 is a simplified block diagram of an electronic system incorporating a microelectronic device according to one embodiment of the present disclosure.

Illustrated in FIG. 13 is a portion of a system 300 in accordance with one embodiment of the present disclosure. The system 300 may comprise a controller 310, an input/output (I/O) device 320 (for instance, a keyboard or a screen), an electromechanical device, in particular the accelerometer 1, a wireless interface 340 and a memory 360, of a volatile or non-volatile type, coupled to one another through a bus 350. In one embodiment, a battery 380 may be used for supplying the system 300. It is to be noted that the scope of the present disclosure is not limited to embodiments that necessarily have one or all of the devices listed.

The controller 310 may comprise, for example, one or more microprocessors, microcontrollers, and the like.

The I/O device 320 can be used for generating a message. The system 300 may use the wireless interface 340 for transmitting and receiving messages to and from a wireless communications network with a radiofrequency (RF) signal. Examples of wireless interface may comprise an antenna, a wireless transceiver, such as a dipole antenna, even though the scope of the present disclosure is not limited from this point of view. In addition, the I/O device 320 may supply a voltage representing what is stored either in the form of a digital output (if digital information has been stored), or in the form of analog output (if analog information has been stored).

The system 300 may be used in apparatuses such as, for instance, a palmtop computer (personal digital assistant, PDA), a laptop computer, or a portable computer, possibly with wireless capacity, a cell phone, a messaging device, a digital music player, a digital camera, or other devices.

Finally, it is clear that modifications and variations may be made to the method and the device described herein, without thereby departing from the scope of the present disclosure.

In the first place, what has been described applies to microelectromechanical devices of different types, amongst which, in particular rotational accelerometers, gyroscopes, pressure sensors, microphones/loudspeakers, micromotors.

As regards accelerometers and gyroscopes, the conformation of the stator electrodes and of the movable mass may even be different from the one described. For example, the electrodes can be comb-fingered, instead of being of the type with plane parallel plates.

The read generator may be implemented by any module or circuit controlled by the control unit 17 so as to supply a square-wave signal in the read configuration and provide a connection to the ground line 26 in the test configuration. Possibly, the function of the read generator may be performed directly by the control unit 17.

The voltages applied to the stator and movable-mass terminals in the test configuration can be different from the supply voltage and from the ground voltage, provided that the difference between them is sufficient to bring the movable mass into one of the positions of maximum extension.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical device comprising:
    a microstructure having a fixed structure and a movable mass, capacitively and mechanically coupled to the fixed structure and movable between a rest position and a maximum extension position;
    a reading interface configured to detect a position of the movable mass;
    a first line configured to supply a first voltage;
    a second line configured to supply a second voltage;
    a configuration stage configured to switch between a first configuration, in which the configuration stage electrically couples the reading interface to the microstructure, and a second configuration, in which the configuration stage electrically decouples the reading interface from the microstructure and couples the fixed structure to the first line, the configuration stage having:
        a first configuration switch configured to electrically couple a first fixed electrode of the fixed structure and a first terminal of the reading interface to each other in the first configuration and electrically decouple the first fixed electrode from the first terminal in the second configuration; and
        a second configuration switch configured to electrically couple a second fixed electrode of the fixed structure and a second terminal of the reading interface to each other in the first configuration and electrically decouple the second fixed electrode from the second terminal in the second configuration;
    a bias element configured to selectively electrically couple the movable mass to the second line; and
    a control unit structured to switch the configuration stage between the first and the second configuration and structured to cause the bias element to electrically couple the movable mass to the second line when the configuration stage is in the second configuration and thereby move the movable mass to the maximum extension position.

2. A device according to claim 1, wherein:
    the microstructure includes a movable mass terminal and first and second stator terminals;
    the first fixed electrode is electrically coupled to the first stator terminal, and the second fixed electrode is electrically insulated from the first fixed electrode and is electrically coupled to the second stator terminal; and
    the movable mass is electrically coupled to the movable mass terminal and is capacitively coupled in a differential manner to the first fixed electrode and to the second fixed electrode.

3. A device according to claim 2, wherein:
    the control unit is structured to close the first configuration switch and the second configuration switch in the first configuration and to open the first configuration switch and the second configuration switch in the second configuration.

4. A device according to claim 2, wherein:
    the configuration stage comprises a first and a second bias switch, respectively arranged between the first stator terminal and the first line and between the first stator terminal and the second line, and a third and a fourth bias switch, respectively arranged between the second stator terminal and the first line and between the second stator terminal and the second line, and
    the control unit is structured to control the first, the second, the third and the fourth bias switch in the first configuration so as to selectively electrically couple the first stator terminal to one of the first line and the second line and the second stator terminal to the other of the first line and the second line.

5. A device according to claim 2, comprising a third line configured to supply a third voltage, wherein:
    the bias element comprises a selector configured to couple the movable mass terminal alternatively to the second line and to the third line, and
    the control unit is structured to control the selector to electrically couple the movable mass terminal cyclically to the second line and to the third line in the first configuration and to connect the movable mass terminal to the second line fixedly in the second configuration.

6. A device according to claim 1, wherein:
    reading interface has an output terminal configured to supply an output signal representative of the position of the movable mass; and
    the control unit includes an input terminal coupled to the output terminal of the reading interface and is configured to a fault condition of the microstructure based on the output signal.

7. A system comprising:
    a first control unit; and
    a microelectromechanical device coupled to the first control unit and including:
        a microstructure having a fixed structure and a movable mass, capacitively and mechanically coupled to the fixed structure and movable between a rest position and a maximum extension position;
        a reading interface configured to detect a position of the movable mass;

a first line configured to supply a first voltage;

a second line configured to supply a second voltage;

a configuration stage configured to switch between a first configuration, in which the configuration stage electrically couples the reading interface to the microstructure, and a second configuration, in which the configuration stage electrically decouples the reading interface from the microstructure and couples the fixed structure to the first line;

a bias element configured to selectively electrically couple the movable mass to the second line; and a second control unit structured to switch the configuration stage between the first and the second configuration and structured to cause the bias element to electrically couple the movable mass to the second line when the configuration stage is in the second configuration and thereby move the movable mass to the maximum extension position.

8. A system according to claim 7, wherein:

the microstructure includes a movable mass terminal and first and second stator terminals;

the fixed structure comprises a first fixed electrode, electrically coupled to the first stator terminal, and a second fixed electrode, electrically insulated from the first fixed electrode and electrically coupled to the second stator terminal; and the movable mass is electrically coupled to the movable mass terminal and is capacitively coupled in a differential manner to the first fixed electrode and to the second fixed electrode.

9. A system according to claim 8, wherein:

the configuration stage comprises a first configuration switch, arranged between the first stator terminal and the reading interface and configured to be controlled by the control unit, and a second configuration switch, arranged between the second stator terminal and the reading interface and configured to be controlled by the control unit, and the control unit is structured to close the first configuration switch and the second configuration switch in the first configuration and to open the first configuration switch and the second configuration switch in the second configuration.

10. A system according to claim 8, wherein:

the configuration stage comprises a first and a second bias switch, respectively arranged between the first stator terminal and the first line and between the first stator terminal and the second line, and a third and a fourth bias switch, respectively arranged between the second stator terminal and the first line and between the second stator terminal and the second line, and the control unit is structured to control the first, the second, the third and the fourth bias switch in the first configuration so as to selectively electrically couple the first stator terminal to one of the first line and the second line and the second stator terminal to the other of the first line and the second line.

11. A system according to claim 8, comprising a third line configured to supply a third voltage, wherein:

the bias element comprises a selector configured to couple the movable mass terminal alternatively to the second line and to the third line, and the control unit is structured to control the selector to electrically couple the movable mass terminal cyclically to the second line and to the third line in the first configuration and to connect the movable mass terminal to the second line fixedly in the second configuration.

12. A system according to claim 7, wherein:

reading interface has an output terminal configured to supply an output signal representative of the position of the movable mass; and the second control unit includes an input terminal coupled to the output terminal of the reading interface and is configured to a fault condition of the microstructure based on the output signal.

13. A microelectromechanical device comprising:

a microstructure having a fixed structure and a movable mass, capacitively and mechanically coupled to the fixed structure and movable between a rest position and a maximum extension position;

a reading interface configured to detect a position of the movable mass;

a configuration stage configured to switch between a first configuration, in which the configuration stage electrically couples the reading interface to the microstructure, and a second configuration, in which the configuration stage electrically decouples the reading interface from the microstructure;

a read generator configured to provide a read signal;

a voltage reference terminal;

a switch configured to selectively couple the movable mass to the read generator and to the voltage reference terminal; and a control unit structured to switch the configuration stage between the first and the second configuration and structured to move the movable mass to the maximum extension position by causing a voltage difference to be applied to the fixed structure and the movable mass.

14. A device according to claim 13, wherein:

the microstructure includes a movable mass terminal and first and second stator terminals;

the fixed structure comprises a first fixed electrode, electrically coupled to the first stator terminal, and a second fixed electrode electrically insulated from the first fixed electrode and electrically coupled to the second stator terminal; and the movable mass is electrically coupled to the movable mass terminal and is capacitively coupled in a differential manner to the first fixed electrode and to the second fixed electrode.

15. A device according to claim 14, wherein:

the configuration stage comprises a first configuration switch, arranged between the first stator terminal and the reading interface and configured to be controlled by the control unit, and a second configuration switch, arranged between the second stator terminal and the reading interface and configured to be controlled by the control unit, and the control unit is structured to close the first configuration switch and the second configuration switch in the first configuration and to open the first configuration switch and the second configuration switch in the second configuration.

16. A device according to claim 14, comprising first and second lines configured to supply first and second voltages, respectively, wherein:

the configuration stage comprises first and second bias switches, respectively arranged between the first stator terminal and the first line and between the first stator terminal and the second line, and third and fourth bias switches respectively arranged between the second stator terminal and the first line and between the second stator terminal and the second line, and the control unit is structured to control the first, the second, the third and the fourth bias switch in the first configuration so as to selectively electrically couple the first stator terminal to one of the first line and the second line and the second stator terminal to the other of the first line and the second line.

17. A device according to claim 14, comprising a third line configured to supply a third voltage, wherein:
the bias element comprises a selector configured to couple the movable mass terminal alternatively to the second line and to the third line, and
the control unit is structured to control the selector to electrically couple the movable mass terminal cyclically to the second line and to the third line in the first configuration and to connect the movable mass terminal to the second line fixedly in the second configuration.

18. A device according to claim 14, wherein:
reading interface has an output terminal configured to supply an output signal representative of the position of the movable mass; and
the control unit includes an input terminal coupled to the output terminal of the reading interface and is configured to a fault condition of the microstructure based on the output signal.

19. A microelectromechanical device comprising:
a microstructure having a fixed structure and a movable mass, capacitively and mechanically coupled to the fixed structure and movable between a rest position and a maximum extension position;
a reading interface configured to detect a position of the movable mass;
a first line configured to supply a first voltage;
a second line configured to supply a second voltage;
a configuration stage configured to switch between a first configuration, in which the configuration stage electrically couples the reading interface to the microstructure, and a second configuration, in which the configuration stage electrically decouples the reading interface from the microstructure and couples the fixed structure to the first line;
a switching element configured to selectively short circuit the movable mass to the second line; and
a control unit structured to switch the configuration stage between the first and the second configuration and structured to cause the bias selector to electrically couple the movable mass to the second line when the configuration stage is in the second configuration and thereby move the movable mass to the maximum extension position.

20. A device according to claim 19, wherein:
the microstructure includes a movable mass terminal and first and second stator terminals;
the fixed structure comprises a first fixed electrode, electrically coupled to the first stator terminal, and a second fixed electrode electrically insulated from the first fixed electrode and electrically coupled to the second stator terminal; and
the movable mass is electrically coupled to the movable mass terminal with a short circuit connection and is capacitively coupled in a differential manner to the first fixed electrode and to the second fixed electrode.

* * * * *